Oct. 5, 1937.  P. MANISCALCO  2,094,662

SEMICONVERTIBLE FUEL OIL ENGINE

Filed Oct. 9, 1935  3 Sheets-Sheet 1

Inventor
Pietro Maniscalco
by J Daniel Stuwe
Attorney

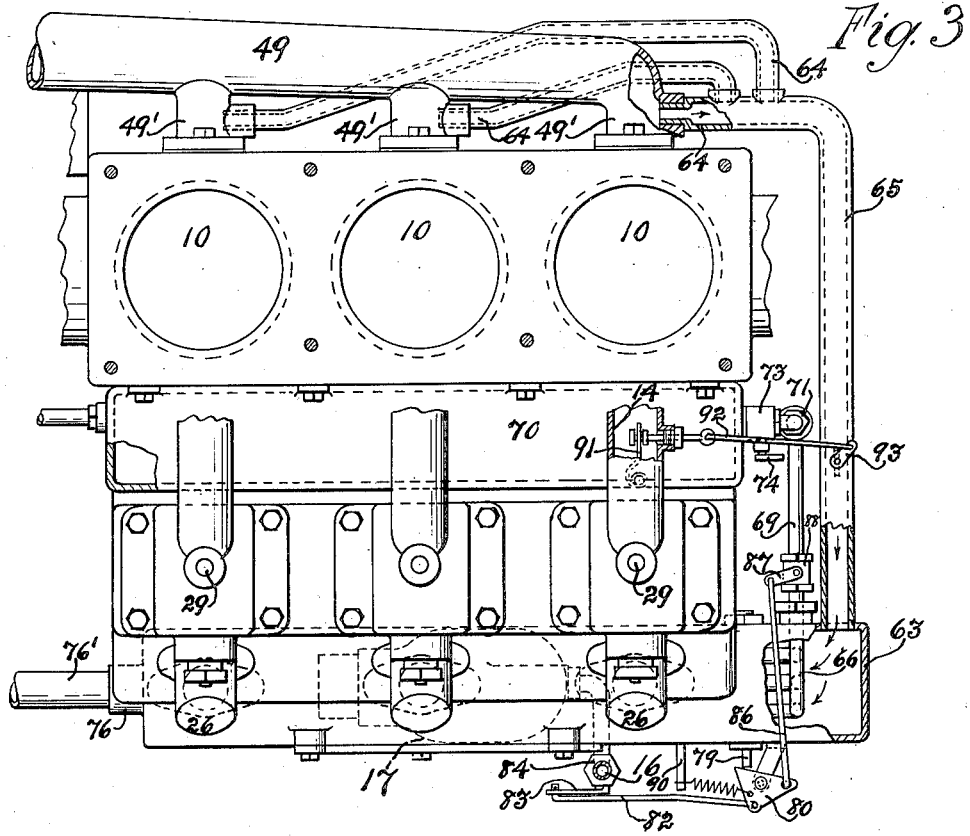
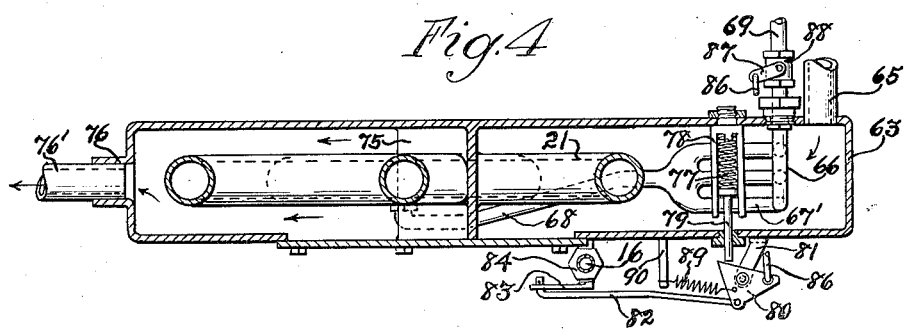

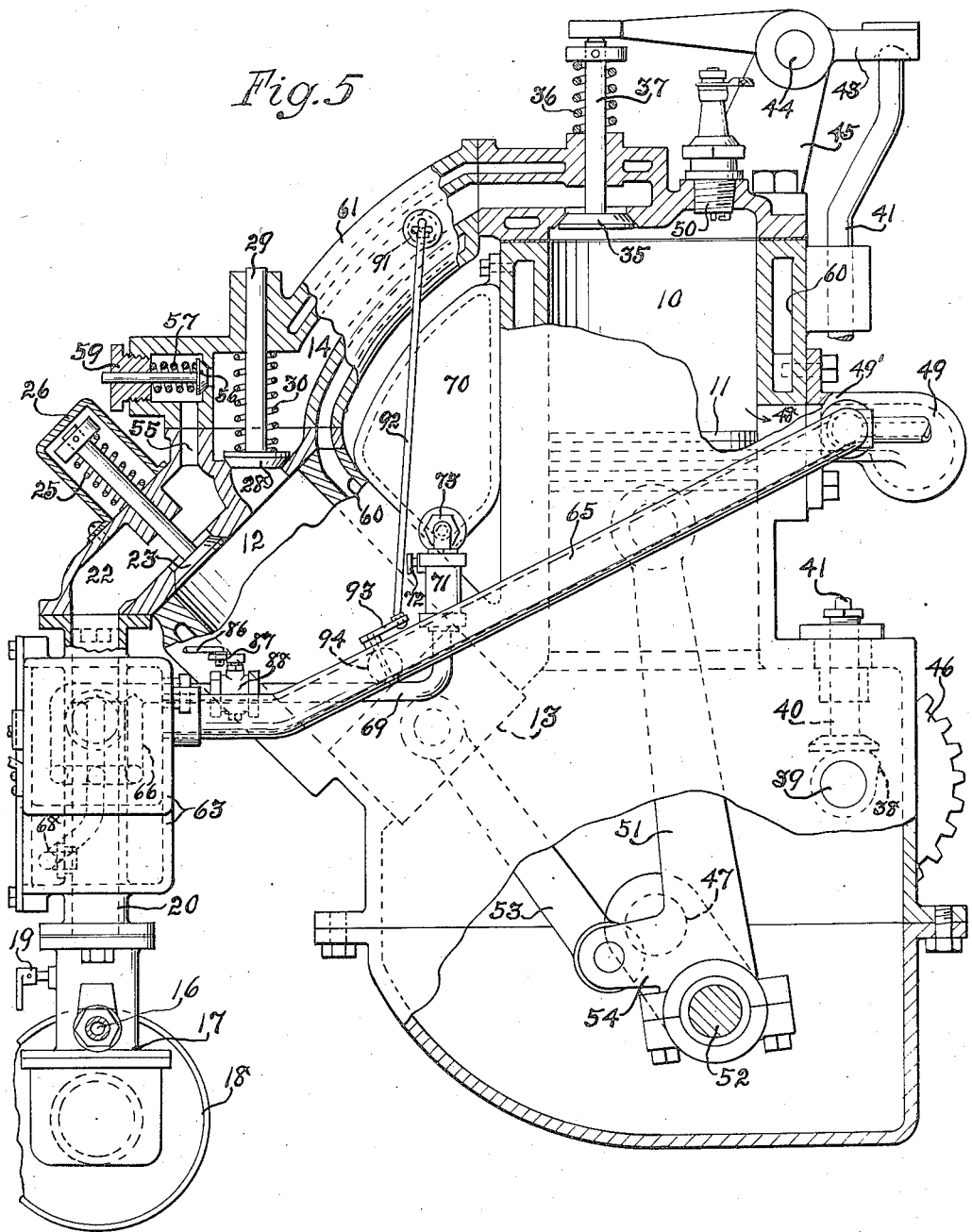

Patented Oct. 5, 1937

2,094,662

UNITED STATES PATENT OFFICE 2,094,662

SEMICONVERTIBLE FUEL OIL ENGINE

Pietro Maniscalco, Toledo, Ohio

Application October 9, 1935, Serial No. 44,239

16 Claims. (Cl. 123—133)

This invention relates to a new and improved semi-convertible fuel oil engine.

One of the main objects of this invention is to provide a convertible internal combustion engine which is arranged and adapted to be operated with the heavy liquid hydro-carbons, such as crude oil, which may be primed with gasoline; and which can also be operated entirely with gasoline.

Another object of this invention is to provide such an engine wherein the exhaust gas is utilized to vaporize the fuel oil; and is additionally utilized to preheat the mixture of oil and air, and also to preheat the mixture of gasoline and air, before the same enters the pre-compression cylinder.

A further object is to provide such an engine with means whereby the feeding of the volatile priming liquid, like gasoline, is automatically stopped, and the feeding of the heavy liquid fuel, like crude oil, is automatically started when the engine is sufficiently heated for vaporizing the fuel oil, thereby effecting a considerable saving of fuel.

These and various other objects and advantages are attained with this invention, as will become apparent from the following description taken in connection with the accompanying drawings wherein the invention is shown in its preferred form of construction, it being understood that various other forms and modifications may be resorted to for carrying out the objects and purposes of this invention.

In the drawings:

Fig. 3 is a plan view of this invention, parts being broken away.

Fig. 4 is a horizontal sectional view, taken on line 4—4 of Fig. 1.

Fig. 5 is an end elevational view of the invention, with parts shown in vertical section.

Figure 1:
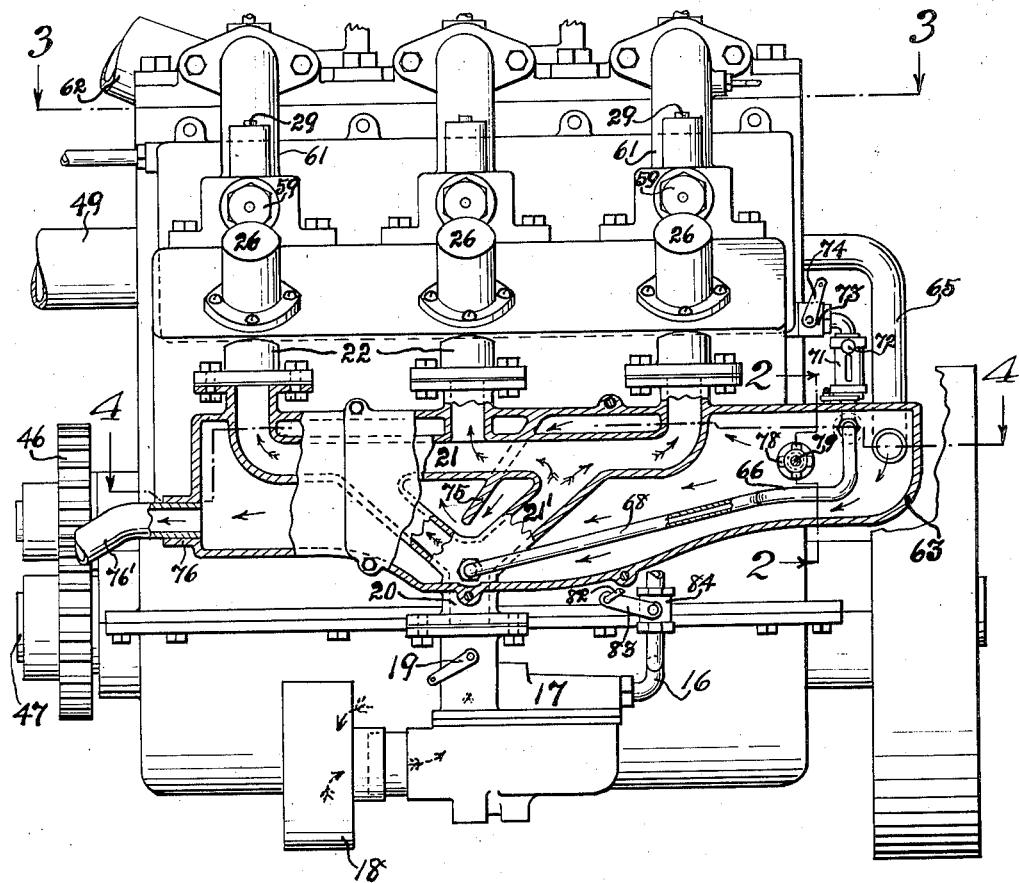
Fig. 1 is a side elevational view of an engine embodying my invention in its preferred form of construction.
Figure 2:
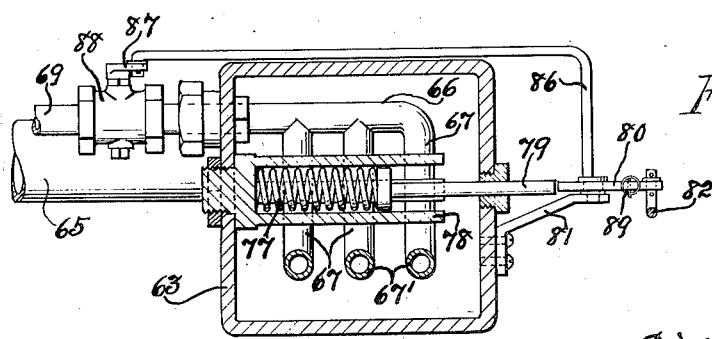
Fig. 2 is an enlarged vertical sectional view, taken on line 2—2 of Fig. 1.

The drawings illustrate my invention in its preferred form of construction, embodied in an internal combustion engine which comprises a combustion or ignition cylinder 10 containing a piston 11 therein, and a supercharging cylinder 12 which contains a piston 13 and wherein the fuel mixture is compressed and preheated. A receiving and storage chamber 14 operatively connects the two cylinders and is of proper size to store the required amount of precompressed and preheated fuel mixture received from cylinder 12 and to supply the same to cylinder 10 under proper temperature and pressure, to provide a positive feed thereof and a full power stroke of piston 11.

The gasoline fuel charge is conveyed from a suitable source of supply, thru supply line 16 to carburetor 17, while the air enters thru air intake and filter member 18, being controlled by valve means 19, in the usual manner; and the premixed charge passes thru conduit 20 into the diverging intake branches 21' of intake manifold 21. The fuel mixture flows therefrom into an entrance chamber 22 provided at the upper end of each cylinder 12, and a valve element 23 closes the valve seat and is movable therefrom into cylinder 12 to admit the fuel mixture thereto from said chamber 22.

By the down stroke of piston 13 valve element 23 is moved from its seat to admit the fuel charge from chamber 22 to supercharging cylinder 12, thereby depressing a spring 25 housed in a cap 26. When the down stroke of piston 13 is completed spring 25 moves valve 23 to its closed position, confining the mixture in the cylinder.

A valve element 28 on a stem 29 is urged by a spring 30 to its closed position on its valve seat, thereby stopping communication between cylinder 12 and storage chamber 14. This spring is sufficiently strong to retain the valve closed during the main upward stroke of piston 13, so that the mixture in cylinder 12 will be compressed to the desired extent, and the valve will then open when a predetermined pressure of the mixture is reached.

The fuel and air mixture is preheated to vaporization by the compression in cylinder 12, and then enters storage chamber 14, where it maintains its pressure and heat. At the end of the upward stroke of piston 13 valve 28 is closed by spring 30, and the preheated and precompressed mixture is confined in chamber 14.

A mechanical valve 35 closes the valve opening provided in the upper end of cylinder 10, to close communication between said cylinder and storage chamber 14. This valve is held closed by a spring 36 provided on valve stem 37 until it is opened by the mechanical valve actuating mechanism, which include a cam 38 on a cam shaft 39 adapted to actuate a stem 40 connected to a rod 41 whereof the upper end actuates a lever 43 pivoted at 44 on a bracket 45 on the cylinder casing. The free end of this lever 43 bears on valve stem 37 whereby to open valve 35 against action of spring 36, so as to open this valve at the proper time for the admission of fuel to cylinder 10, thru the operation of suitable timing gear means, indicated at 46, which are driven by crankshaft 47 in the usual manner.

An exhaust port 48 is provided in the peripheral wall of cylinder 10, substantially midway of its length, and communicates thru a branch conduit 49' with exhaust manifold 49. This port is so placed, and the mechanism for operating valve 35 is so arranged and timed, that the valve starts opening before exhaust port 48 is fully uncovered by the descending piston, thereby admitting the precompressed charge to the cylinder 10 in time to assist in clearing said cylinder of dead gases formed therein by the previous explosion. When the exhaust gases have been forced out of cylinder 10 and the exhaust port 48 is closed by piston 11 during its upward stroke, then the combustion cylinder 10 will be filled with a clean fuel mixture obtained from storage chamber 14; whereupon lever 43 thru the action of the timing mechanism releases its pressure on valve stem 37, and spring 36 closes valve 35. The final compression then takes place by piston 11 completing its upward stroke, and the highly compressed mixture is fired by the action of spark plug 50 mounted in the upper end of cylinder 10, whereby the piston 13 is forced downward on its power stroke, until it clears exhaust port 48 and the burnt gases are rejected into exhaust manifold 49.

A piston rod 51 is pivoted to piston 11 and is rotatably mounted on crank 52 of crankshaft 47, and a piston rod 53 is pivoted to piston 13 and is pivotally connected to a bracket arm 54 which is offset laterally from rod 51. Such offset connection of rod 53 to rod 51 provides a definite advance of stroke of the supercharging piston relative to the main piston. This permits a dependable control of admission of fuel thru the automatic valve and thru the mechanical valve, for governing the interrelation between the combustion chamber and the timing of the power stroke and the precompression stroke, so as to be adjustable for different fuel mixtures.

A safety valve is provided to prevent accumulation of excessive pressure in storage chamber 14. This comprises a bypass 55 formed in the top part of cylinder 12, connecting chamber 14 with chamber 22. Said bypass is closed by a valve element 56 held by a spring 57 against its valve seat. The tension of this spring and the opening of this valve is adjustable by means of an adjusting nut 59, so that the valve will open to admit fuel mixture from chamber 14 into chamber 22 when the pressure in chamber 14 becomes too great due to improper functioning of valves 29 and 35, etc.

Cooling jackets 60 are provided around the two cylinders and communicate with a cooling jacket 61 provided around the storage chamber 14, while a hot water return pipe 62 conducts the hot water from said jackets to a suitable radiator.

Means is provided herein for preheating the fuel mixture by use of the hot exhaust gases from the exhaust manifold. This means comprises a preheater or preheating casing 63 which encloses the intake manifold, and is preferably cast integral therewith; and it further comprises one or more branch conduits 64 each of which extends from one of the branches 49' of exhaust manifold 49 to a main conduit 65 which extends to preheating casing 63, adapted to conduct part of the exhaust gases from said manifold to said casing.

An oil vaporizing unit 66 is mounted adjacent one end of preheating casing 63, so that the hot gases flow thereover when entering the casing. This unit preferably includes several branch tubes 67 which extend downwardly and are then bent to provide lower horizontal portions 67' which converge at their forward ends into a pipe 68 extending to the entrance of branches 21' of intake manifold 21 adjacent the junction of said branches with conduit 20.

Unit 66 receives its fuel oil thru a feed pipe 69 which extends from an auxiliary feed tank 70, said tank being preferably mounted between cylinders 10 and 12 and chambers 14, so as to save space. An oil sight feed 71 is interposed in feed pipe 69, and an adjusting element 72 is connected with the sight feed for adjusting the same. A control valve 73 is also interposed in feed pipe 69 and is provided with an operating handle 74 adapted to be actuated in any convenient manner by the person operating the engine.

A baffle plate 75 is provided in the preheating casing 63, adjacent branches 21' of intake manifold 21, and is slanted downwardly away from the inlet end of the casing, so as to direct the currents of hot exhaust gases closely along said branches 21', as indicated in Fig. 1 of the drawings.

The first section or entrance portion of the preheating casing 63, into which the hot exhaust gases enter while they are hottest serves as the oil vaporizing section and has the oil vaporizing unit mounted therein so that the hot gases flow over and around said unit; and the remaining part of the casing, beyond said unit 66, which houses the intake manifold and whereto the gases next flow, serves as the mixture preheating section, for preheating both the mixture of fuel oil and air, and likewise the mixture of gasoline and air, before either mixture flows into the entrance chamber 22 and the associated supercharging cylinder 12. A port 76 at the far end of the casing, and a pipe 76' extending therefrom, serve as outlet means for the exhaust gases that have been thus utilized.

Automatic control means is provided for controlling the admission of fuel to the combustion cylinder, so that one kind of fuel only will be used at a time, although this engine is adapted to operate with several kinds of fuel and it is arranged to have several kinds of fuel carried along therewith, as fuel oil and gasoline, for example. Said control means is arranged to shut-off the priming fluid, like gasoline, after the engine has been started sufficiently and heated, and will then admit the heavier hydrocarbon fuel, like fuel oil, to be fed to the vaporizing unit and the intake manifold. Said means illustrated herein comprises a thermostatic element 77 mounted in a frame 78 which is mounted within casing 63, and a stem 79 which extends from said frame and casing and is actuated by the expansion of said element thereby swinging an operating member 80 which is pivoted on a bracket arm 81 extending from the casing. A rod 82 extends from the outer end of member 80 to an operating lever 83 on a valve 84 interposed in gasoline supply pipe 16, for controlling the flow of gasoline therethru to the carburetor. A rod 86 extends from operating member 80 to a lever 87 on a valve 88 interposed in oil feed pipe 69, for automatically operating said valve to open and close the same and to control the flow of fuel oil to the vaporizing unit and the intake manifold.

The automatic control means also includes means to normally keep the oil line closed and the gasoline line open while the casing 63 and the vaporizing unit 66 are insufficiently heated. This means preferably includes a spring 89 which is connected to operating member 80 and to an arm 90 on casing 63, so as to hold lever 83 and gasoline control valve 84 in the open position, and to hold lever 87 and oil control valve 88 in the closed position, until said unit and casing are sufficiently heated. When oil vaporizing unit 66 is sufficiently heated to vaporize the oil flowing therethru, then element 77 which is adjacent said unit has also expanded sufficiently and has forced stem 79 outwardly to swing member 80 and thereby move rods 82 and 86 and the respective valve levers 83 and 87; so as to close the gasoline control valve 84 when gasoline is no longer needed as a priming fluid, and to open the oil control valve 88 and from thereon operate the engine with the less expensive fuel oil.

For starting the operation of this engine, from the normal condition of rest while casing 63 is unheated, the oil feed valve 88 stands closed and the gasoline control valve 84 stands open, in the positions indicated in the drawings. Then by operating the lever 19 on the carburetor, in the usual manner, the engine will be started by a gasoline and air mixture as heretofore. When the exhaust gases have heated casing 63 sufficiently to vaporize the oil in unit 66, then element 77 has also expanded sufficiently to swing member 80 and close valve 84 and open valve 88, and operate the engine with the fuel oil.

In the meantime, lever 19 and its valve on the carburetor are retained in the open position, and the air enters therethru and mingles with the vaporized oil entering in close proximity thereto thru pipe 68 into the diverging branches 21' of the intake manifold. The further feeding of the fuel oil is then continued automatically, and it is only necessary to control the feeding of the oil manually when it is desired to increase or decrease the speed of the engine, which is done by operating control lever 74 on feed pipe 69, in any approved and known manner.

Whenever it is desirable to operate the engine with gasoline only, as for example when the fuel oil tank 70 has become empty and no fuel oil supply is available near by, then the automatic control means can be readily converted so that this engine will operate as a gasoline engine. This can be effected by disconnecting one end of each of the rods 82 and 86, either from operating member 80 or from valve levers 83 and 87 respectively, so that gasoline control valve 84 stands open and oil control valve 88 stands closed. The removal of a cotter pin at the end of the rod will permit such ready and convenient disconnection of said end.

Automatic gas control means is also provided with this invention, whereby to control the flow of hot gases from the exhaust manifold to the preheating casing 63, and thereby to control the heating effect upon oil vaporizing unit 66. This control means is optionally installed in this improved engine, and in the form illustrated herein it comprises a thermostatic element 91 mounted in storage chamber 14, and a rod 92 extending from said element to a lever 93 of a control valve 94 mounted in exhaust gas conduit 65. With this arrangement any excessive heat occurring in storage chamber 14 actuates element 91, and thru rod 92 and lever 93 operates valve 94, to diminish and control the volume of hot exhaust gases flowing to preheating chamber 63 and thereby diminish the heating effect on oil vaporizing unit 66, thus preventing any excessive heating of the preheating chamber 63, the vaporizing unit 66 and the storage chamber 14.

I claim:

1. In an internal combustion engine having an intake manifold and means thereon including a supply pipe adapted to conduct a priming fluid thereto, a combustion cylinder, means receiving fuel mixture from the manifold and precompressing it, means for storing and conducting said mixture to the cylinder, a supply pipe conducting fuel oil into said manifold and provided with an oil vaporizing unit, a preheating casing enclosing said manifold and said vaporizing unit, bypass means conducting hot exhaust gas from the cylinder into the casing to heat said unit and said manifold, automatic control means actuated by the heat in said casing for stopping the supply of priming fluid in its pipe and admitting the supply of fuel oil thru its pipe when the vaporizing unit is sufficiently heated to vaporize the oil therein, and automatic means including thermostatic means mounted in said precompressed fuel storing means and actuated by the heat therein, for regulating the volume of hot exhaust gas flowing thru the bypass means to the preheating casing.

2. In an internal combustion engine having an intake manifold and means thereon including a supply pipe adapted to conduct gasoline thereto, a combustion cylinder, means receiving fuel mixture from the manifold and precompressing it, means for storing and conducting said mixture to the cylinder, said cylinder and precompressing means being connected at their lower ends and diverging toward the upper ends which are operatively connected by said mixture storing and conducting means, a fuel oil tank mounted compactly in the space between the cylinder and the precompressing means and storing means, a supply pipe conducting fuel oil from said tank to said manifold and including an oil vaporizing unit, a preheating casing enclosing said manifold and said vaporizing unit, means conducting hot exhaust gas from the cylinder to the casing to heat said unit and said manifold, and automatic control means actuated by the heat in the casing whereby the admission of fuel is restricted in one supply pipe while it is enlarged in the other.

3. In an internal combustion engine including a combustion cylinder and an intake manifold operatively connected therewith and provided with a gasoline supply pipe, a supply pipe conducting fuel oil to said manifold and provided with an oil vaporizing unit, preheating means including a casing enclosing the vaporizing unit and the manifold, means conducting hot exhaust gas from the cylinder into the casing to flow upon said unit and then over the manifold for vaporizing the fuel oil in the unit and also for preheating the gasoline fuel mixture and likewise the oil fuel mixture within the manifold, and automatic control means including valve means in the gasoline pipe and in the oil pipe also an operating member connected with said valves and a thermostatic element in the casing provided with means for operating said member, whereby the gasoline pipe is closed and the oil pipe is opened when the vaporizing unit is sufficiently heated to vaporize the oil therein.

4. In an internal combustion engine having a combustion cylinder and an intake manifold, also fuel precompressing and conducting means operatively connecting the two, a carburetor connected with the inlet end of the manifold and provided with air inlet means and with a gasoline supply pipe, a fuel oil supply pipe connected to the inlet end of the manifold and provided with an oil vaporizing unit, adapted to convey into the manifold the vaporized oil to comingle with the air entering thru said air inlet means on the carburetor, a preheating casing enclosing said vaporizing unit and said manifold, means conducting hot exhaust gas from the cylinder to the casing to vaporize the oil in said unit, and also to preheat the gasoline fuel mixture and likewise the oil fuel mixture before entering the precompressing means, automatic control means including a valve in each supply pipe, an operating member on the casing and having means to connect it with the valves for actuating them, means connected to said operating member to normally hold the gasoline valve open and the oil valve closed, and a thermostatic element adjacent the unit in the casing and having means thereon to actuate said operating member, whereby to close the gasoline valve and to open the fuel oil valve when the unit is sufficiently heated to vaporize the oil therein.

5. The subject matter of claim 4 and wherein the connecting means between the operating member and the valves is adapted to be readily disconnected therefrom, so as to adapt the engine to be operated entirely with gasoline.

6. The subject matter of claim 4 and including valve means in the gas conducting means also thermostatic means in the fuel conducting means to actuate said valve for regulating the volume of hot exhaust gas flowing to the preheating casing and unit therein.

7. In an internal combustion engine having an intake manifold and means thereon including a supply pipe adapted to conduct gasoline thereto, a combustion cylinder, means for conducting a fuel mixture from the manifold to the combustion cylinder, a pipe conducting fuel oil into said manifold and having oil vaporizing means, a preheating casing enclosing said manifold and said vaporizing means, a bypass pipe conducting hot exhaust gas from the combustion cylinder into said casing to flow first upon said vaporizing means and then around the manifold, and automatic control means including a valve in said bypass pipe and a thermostatic element in said conducting means being operatively connected with said valve, whereby to regulate the admission of hot gas to said casing.

8. In an internal combustion engine having a combustion cylinder and an intake manifold, also means operatively connecting the cylinder with the manifold, a carburetor connected with the manifold and provided with air inlet means and a gasoline supply pipe, a fuel oil pipe connected to the manifold and provided with an oil vaporizing unit, adapted to convey vaporized oil into the manifold to comingle with the air entering thru the air inlet and carburetor, a preheating casing enclosing said vaporizing unit and manifold, a bypass pipe conducting hot exhaust gas from the cylinder to the casing to flow upon said unit and then around the manifold, to vaporize the oil in said unit and then also preheat either of the fuel mixtures before entering said connecting means, and automatic control means including a valve in each supply pipe and an operating member connected therewith to initially hold the gasoline pipe valve open and the oil pipe valve closed, also a thermostatic element in the casing to operate said member, whereby the gasoline pipe valve is closed and the oil pipe valve is opened when the unit is sufficiently heated to vaporize the oil therein.

9. The subject matter of claim 8 and wherein the connections between the operating member and the valves may be readily separated from said chamber to adapt the engine to be operated entirely with gasoline.

10. The subject matter of claim 8 and including automatic control means comprising a valve in the bypass pipe, also a thermostatic element in said manifold and cylinder connecting means to actuate said valve for regulating the volume of hot exhaust gas flowing to the preheating casing.

11. In an internal combustion engine having a combustion cylinder and an intake manifold and fuel precompressing means and storing means operatively connecting the cylinder with the manifold, a carburetor and valve controlled means connecting it with the manifold, air inlet means and a gasoline supply pipe on the carburetor, a fuel oil pipe entering the manifold adjacent said connecting means and being provided with an oil vaporizing unit, adapted to conduct vaporized oil into the manifold to comingle with the air entering thru said connecting means, a fuel oil tank mounted between said cylinder and said precompressing means and storing means, to supply oil to said oil pipe, a preheating casing enclosing said vaporizing unit and manifold, bypass means conducting hot exhaust gas from the cylinder to the casing to flow over said unit and the manifold, to vaporize the oil in said unit and then furthermore preheat both of the fuel mixtures before entering the fuel precompressing means, automatic fuel control means including a valve in each supply pipe and a spring held operating member and means connecting it with said supply valves to normally hold the oil valve closed and the gasoline valve open, and a thermostatic element in said casing having means to actuate said member to open the oil valve and to close the gasoline valve when the unit is sufficiently heated to vaporize the oil therein.

12. The subject matter of claim 11 and wherein the thermostatic means which connects the operating member with the valves may be readily detached therefrom, to free the valves from control of said operating member and thermostatic element and adapt the engine to be operated entirely with gasoline.

13. In an internal combustion engine including a combustion cylinder and an intake manifold and means operatively connecting them, means including a valved supply pipe for conducting gasoline to the inlet end of said manifold, a valved supply pipe for conducting fuel oil into the inlet end of said manifold and being provided with an oil vaporizing unit, a preheating casing enclosing said manifold and said vaporizing unit, means for conducting hot exhaust gas from the combustion cylinder into the preheating casing, whereby to vaporize the fuel oil in said unit and also to preheat the gasoline fuel mixture and likewise the oil fuel mixture before entering the cylinder, thermostatic means mounted in and actuated by the temperature in said casing and operatively connected with said supply pipe valves to control the admission of either gasoline or fuel oil to said manifold, and means on the last said connecting means operable to render said thermostatic control means ineffective, whereby gasoline may be used alone to operate the engine without interference by said thermostatic means.

14. In an internal combustion engine, a combustion cylinder, an intake manifold and means operatively connecting it with the cylinder, a carburetor connected to the manifold and provided with air inlet means and a gasoline supply pipe, to convey light fuel mixture to the manifold, a supply pipe for conducting oil and heavy fuel into the manifold, a preheating casing enclosing said manifold and constituting therewith an integral unit, a vaporizing unit interposed in said oil supply pipe within said casing, means for conducting hot exhaust gas from the cylinder upon said vaporizing unit in said casing to vaporize the fuel oil in said unit and also to preheat the gasoline fuel mixture and likewise the oil fuel mixture before entering the cylinder, and automatic control means including valve means for controlling the flow of gasoline and of oil thru said pipes, also a thermostatic element in the casing and means operatively connecting it with said valve means, whereby the gasoline is shut off and the oil is admitted to the vaporizing unit when the latter is sufficiently heated to vaporize the oil therein, said connecting means between the valve means and said element being disconnectable for operating the engine with gasoline alone.

15. In an internal combustion engine including a plurality of combustion cylinders, an intake manifold having branches diverging from its inlet end also having a plurality of fuel mixture conducting means operatively connecting the manifold with the cylinders, a fuel oil pipe connected to said inlet end of the manifold and having an oil vaporizing unit interposed therein adjacent the manifold, a compact shell-shaped preheating casing which constitutes an integral unit with the manifold and has said manifold positioned in one side thereof and said vaporizing unit in the other side, and a bypass conduit connected to the casing adjacent said vaporizing unit and having branches connecting it with the exhaust means of the several cylinders, to conduct hot exhaust gas from the cylinders to the casing to flow first upon the vaporizing unit and vaporize the oil therein and then also flow around the manifold and preheat the fuel mixture.

16. In an internal combustion engine having an intake manifold and means thereon including a supply pipe adapted to conduct a priming fluid thereto, a combustion cylinder, means receiving fuel mixture from the manifold and precompressing it, means for storing and conducting said mixture to the cylinder, a supply pipe conducting fuel oil into said manifold and being provided with an oil vaporizing unit, a preheating casing enclosing said manifold and said unit, bypass means conducting hot exhaust gas from the cylinder into the casing to heat said unit and manifold, control means including a valve in each supply pipe and operating means connected therewith for shutting off the supply of priming fluid and admitting the supply of fuel oil when said unit is sufficiently heated to vaporize the oil therein, and automatic means including thermosensitive means in said fuel storing means for regulating the volume of hot exhaust gas flowing thru the bypass means to the preheating casing.

PIETRO MANISCALCO.